US011887297B2

(12) United States Patent
Schiefelbein et al.

(10) Patent No.: US 11,887,297 B2
(45) Date of Patent: *Jan. 30, 2024

(54) AUTOMATED ANALYSIS OF LATTICE STRUCTURES USING COMPUTED TOMOGRAPHY

(71) Applicant: Honeywell Federal Manufacturing & Technologies, LLC, Kansas City, MO (US)

(72) Inventors: Bryan E. Schiefelbein, Kansas City, MO (US); Christopher Alan Griffiths, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/299,177

(22) Filed: Apr. 12, 2023

(65) Prior Publication Data

US 2023/0334654 A1 Oct. 19, 2023

Related U.S. Application Data

(63) Continuation-in-part of application No. 17/955,341, filed on Sep. 28, 2022, which is a continuation of
(Continued)

(51) Int. Cl.
*G06T 7/00* (2017.01)
*G06T 3/40* (2006.01)

(52) U.S. Cl.
CPC ............ *G06T 7/001* (2013.01); *G06T 3/4038* (2013.01); *G06T 2200/24* (2013.01);
(Continued)

(58) Field of Classification Search
CPC .......... A61B 6/032; A61B 6/03; A61B 6/037; A61B 6/035; B33Y 10/00; B33Y 80/00;
(Continued)

(56) References Cited

U.S. PATENT DOCUMENTS 9,656,429 B1 * 5/2017 Mantha ................. B33Y 50/02
11,351,732 B2 * 6/2022 Xu ........................ B29D 24/001
(Continued)

OTHER PUBLICATIONS

Amani et al "Compression behavior of lattice structures produced by selective laser melting: X-ray tomography based experimental and finite element approaches". Acta Materialia, 2018, 159, pp. 395-407. 10.1016/j.actamat.2018.08.030. hal-01890580 (Year: 2018).*

*Primary Examiner* — Ian L Lemieux
(74) *Attorney, Agent, or Firm* — Erise IP, P.A.

(57) ABSTRACT

Systems, methods, and computer-readable media for evaluating a set of computed tomography data associated with a lattice structure. The lattice structure may be additively manufactured. The computed tomography data may be segmented using a filter for identifying blob-like structures to identify nodes present within the lattice structure. A three-dimensional path traversal is applied to volumetric data to identify a plurality of struts within the lattice structure that are compared to corresponding struts within a set if three-dimensional mesh data of the lattice structure to identify defective struts. Further, two-dimensional slices may be extracted from each of the computed tomography data and the mesh data and compared to identify one or more inconsistencies indicative of defects within the lattice structure.

20 Claims, 8 Drawing Sheets

Related U.S. Application Data application No. 17/720,875, filed on Apr. 14, 2022, now Pat. No. 11,669,959.

(52) U.S. Cl.
CPC ............... *G06T 2207/10081* (2013.01); *G06T 2207/20044* (2013.01); *G06T 2207/20092* (2013.01)

(58) Field of Classification Search
CPC ..... B33Y 50/02; B29C 64/393; B29C 64/118; G01N 23/046; G01N 2223/419; G01N 23/04; G01N 2223/401; G01N 29/069; A61F 2002/30784; A61F 2002/30838; A61F 2002/3084; A61F 2002/30968; A61F 2002/3097; A61L 2430/02; A61L 2400/12; A61L 2400/08; B29L 2031/7532; A61N 2005/1076; B22F 10/20; G05B 2219/49008; G05B 2219/49019; G05B 2223/02; G06F 30/00; G06T 2207/10081; G06T 2207/10116; G06T 2211/40; G06T 7/0004
See application file for complete search history.

(56) References Cited

U.S. PATENT DOCUMENTS

| | | | |
|---|---|---|---|
| 2018/0243997 A1* | 8/2018 | Selvasekar | B33Y 10/00 |
| 2020/0130267 A1* | 4/2020 | Zhang | B29C 64/35 |
| 2020/0226303 A1* | 7/2020 | Benjamin | B33Y 80/00 |
| 2021/0263498 A1* | 8/2021 | Bandara | B33Y 50/00 |

\* cited by examiner

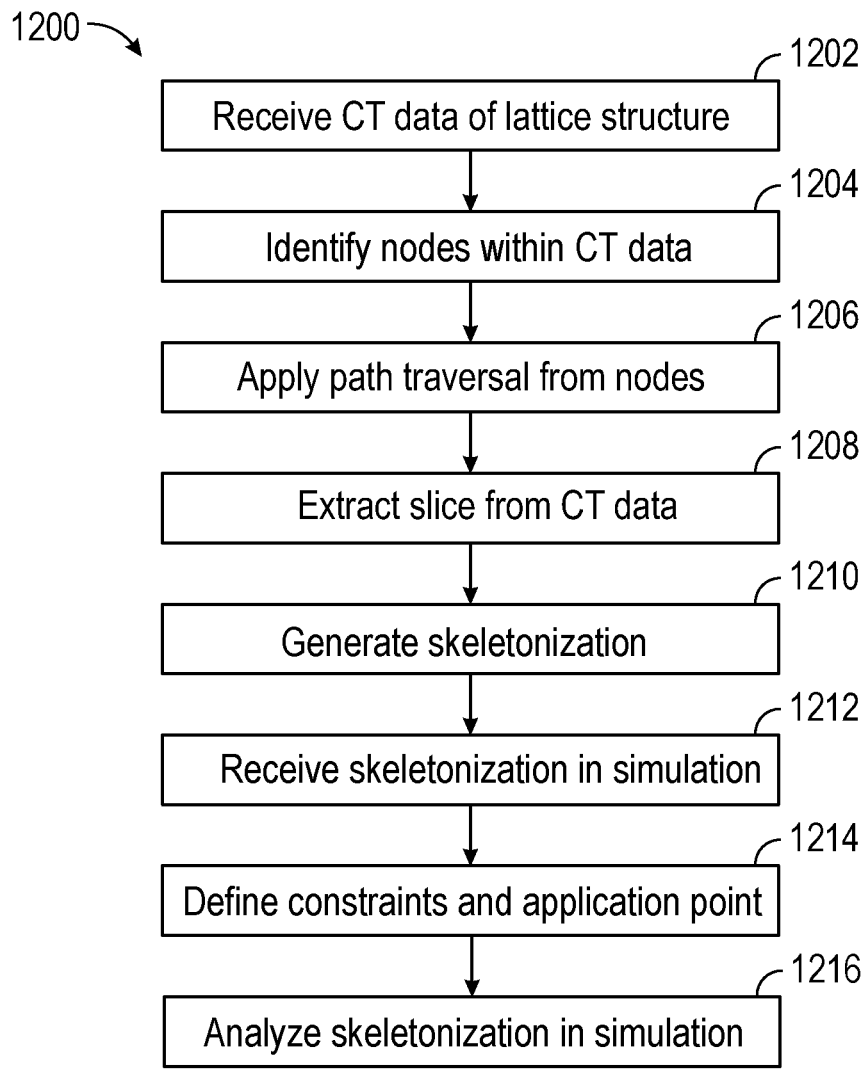

AUTOMATED ANALYSIS OF LATTICE STRUCTURES USING COMPUTED TOMOGRAPHY

CROSS-REFERENCE TO RELATED APPLICATIONS

This patent application is a continuation-in-part application claiming priority benefit, with regard to all common subject matter, of U.S. patent application Ser. No. 17/720,875, filed Apr. 14, 2022, and entitled "AUTOMATED ANALYSIS OF LATTICE STRUCTURES USING COMPUTED TOMOGRAPHY" and U.S. patent application Ser. No. 17/955,341, filed Sep. 28, 2022, also entitled "AUTOMATED ANALYSIS OF LATTICE STRUCTURES USING COMPUTED TOMOGRAPHY". The identified earlier-filed patent applications are hereby incorporated by reference in their entirety.

STATEMENT OF GOVERNMENTAL SUPPORT

This invention was made with government support under DE-NA0002839 awarded by the United States Department of Energy/National Nuclear Security Administration. The government has certain rights in the invention.

BACKGROUND

1. Field

Embodiments of the invention relate to lattice structures and computed tomography analysis. More specifically, embodiments of the invention relate to evaluating lattice structures for defects based on computed tomography data.

2. Related Art

Additively manufactured lattice structures are becoming more complex over time to provide innovative solutions in various technological fields. However, these lattice structures comprising the base components of nodes and struts have proven to be exceedingly difficult to evaluate for defects. Specifically, defects associated with strut morphology are difficult or even impossible to detect within an additively manufactured lattice structure. Further, the sheer number of struts within a lattice structure results in manual and computational barriers. For example, an exemplary octet-truss lattice structure may comprise somewhere on the order of thousands of struts. As such, it becomes difficult for the individual struts to be evaluated manually. Further still, basic imaging technology is only capable of evaluating struts on the outer surface of the lattice structure such that internal defects are missed.

Structural simulations typically use finite element analysis (FEA) techniques to compute structural properties by constructing a mesh of a subject object or system. The mesh subdivides the geometry of the subject object into a plurality of cells or finite elements, known as meshing. For example, one common 3-dimensional element includes the tetrahedron such that the subject object is divided into a plurality of tetrahedrons filling the volume of the object. The accuracy of the overall representation increases with the number of elements. However, meshing an object into a large number of smaller elements takes large amounts of time and processing power. Additionally, running simulations with a large quantity of complex elements is also extremely time and processing intensive. Further still, the accuracy of the simulation is limited by the error between the meshed representation and the actual geometry of the object. Accordingly, the mesh need to be doctored and adjusted to achieve a suitable accuracy of the simulation.

SUMMARY

Embodiments of the invention solve the above-mentioned problems by providing systems, methods, and computer-readable media for performing an evaluation on computed tomography data of a lattice structure by filtering the computed tomography data to find nodes within the lattice, gathering three-dimensional path information from the struts through a thinning algorithm, and comparing one or more cross-sections extracted from the computed-tomography data to respective nominal cross-sections from a three-dimensional mesh associated with the lattice structure, as well as comparing one or more struts within the computed tomography data to struts within the three-dimensional mesh to identify one or more defects within the lattice structure.

In some aspects, the techniques described herein relate to a method for evaluating a lattice structure, the method including receiving a set of computed tomography data including a volumetric representation of the lattice structure, applying a filter to the set of computed tomography data to identify a plurality of nodes within the lattice structure, applying a three-dimensional path traversal from a node of the plurality of nodes to identify a plurality of struts within the lattice structure from the set of computed tomography data, comparing each strut of the plurality of struts from the set of computed tomography data to a respective strut of a plurality of struts identified within a predefined mesh for the lattice structure to identify one or more defective struts, extracting one or more slices from the set of computed tomography data based at least in part on the three-dimensional path traversal, comparing an actual cross-section of the one or more extracted slices to a nominal cross-section from the predefined mesh to determine one or more inconsistencies between the lattice structure and the predefined mesh, and identifying one or more defects in the lattice structure based on the one or more inconsistencies and the one or more defective struts.

In some aspects, the techniques described herein relate to a method, further including scanning the lattice structure using a computed tomography scanner to obtain the set of computed tomography data, wherein the lattice structure is additively manufactured.

In some aspects, the techniques described herein relate to a method, further including responsive to identifying the one or more defects, displaying a notification indicative of the one or more defects to an operator.

In some aspects, the techniques described herein relate to a method, further including applying the filter to the predefined mesh to identify a plurality of nodes within the predefined mesh, and applying a three-dimensional path traversal from a node of the plurality of nodes within the predefined mesh to identify a plurality of struts within the predefined mesh.

In some aspects, the techniques described herein relate to a method, further including generating a mesh data skeletonization of the lattice structure by applying a thinning algorithm to the predefined mesh, and generating a computed tomography data skeletonization of the lattice structure by applying the thinning algorithm to the computed tomography data.

In some aspects, the techniques described herein relate to a method, wherein the one or more extracted slices are normal to a medial axis defined by the mesh data skeletonization and the computed tomography data skeletonization.

In some aspects, the techniques described herein relate to a method, further including generating an adjacency matrix for each node of the plurality of nodes from the computed tomography data representing one or more connections between adjacent nodes, generating a mesh adjacency matrix for each node of the plurality of nodes from the predefined mesh representing one or more connections between adjacent nodes, and comparing the adjacency matrices to the mesh adjacency matrices.

In some aspects, the techniques described herein relate to one or more non-transitory computer-readable media storing computer-executable instructions that, when executed by at least one processor, perform a method for evaluating a lattice structure, the method including receiving a set of computed tomography data including a volumetric representation of the lattice structure, applying a filter to the set of computed tomography data to identify a plurality of nodes within the lattice structure, applying a three-dimensional path traversal from a node of the plurality of nodes to identify a plurality of struts within the lattice structure from the set of computed tomography data, comparing each strut of the plurality of struts from the set of computed tomography data to a respective strut of a plurality of struts identified within a predefined mesh for the lattice structure to identify one or more defective struts, extracting one or more slices from the set of computed tomography data based at least in part on the three-dimensional path traversal, comparing an actual cross-section of the one or more extracted slices to a nominal cross-section from the predefined mesh to determine one or more inconsistencies between the lattice structure and the predefined mesh, and identifying one or more defects in the lattice structure based on the one or more inconsistencies and the one or more defective struts.

In some aspects, the techniques described herein relate to a computer-readable media, further including receiving, from a user, a first user selection of a computed tomography file within a user interface associated with a lattice structure evaluation application, the computed tomography file including the set of computed tomography data, responsive to the first user selection, importing the computed tomography file into the lattice structure evaluation application, receiving, from the user, a second user selection of a mesh file within the user interface, the mesh file including the predefined mesh, and responsive to the second user selection, importing the mesh file into the lattice structure evaluation application.

In some aspects, the techniques described herein relate to a computer-readable media, further including causing display of a notification within the user interface, the notification including an indication of the one or more defects.

In some aspects, the techniques described herein relate to a computer-readable media, wherein the notification further includes a visual representation of the lattice structure, wherein the lattice structure is additively manufactured.

In some aspects, the techniques described herein relate to a computer-readable media, wherein the filter includes a modified Frangi filter.

In some aspects, the techniques described herein relate to a computer-readable media, further including scaling a scanning resolution of the set of computed tomography data based on an average strut width of the lattice structure.

In some aspects, the techniques described herein relate to a computer-readable media, further including stitching two or more portions of computed tomography data representing respective portions of the lattice structure to form the set of computed tomography data.

In some aspects, the techniques described herein relate to a system for evaluating a lattice structure, the system including at least one processor, and one or more non-transitory computer-readable media storing computer-executable instructions that, when executed by the at least one processor, perform a method for evaluating the lattice structure, the method including receiving a set of computed tomography data including a volumetric representation of the lattice structure, applying a filter to the set of computed tomography data to identify a plurality of nodes within the lattice structure, applying a three-dimensional path traversal from a node of the plurality of nodes to identify a plurality of struts within the lattice structure from the set of computed tomography data, comparing each strut of the plurality of struts from the set of computed tomography data to a respective strut of a plurality of struts identified within a predefined mesh for the lattice structure to identify one or more defective struts, extracting one or more slices from the set of computed tomography data based at least in part on the three-dimensional path traversal, comparing an actual cross-section of the one or more extracted slices to a nominal cross-section from the predefined mesh to determine one or more inconsistencies between the lattice structure and the predefined mesh, and identifying one or more defects in the lattice structure based on the one or more inconsistencies and the one or more defective struts.

In some aspects, the techniques described herein relate to a system, further including calculating an acceptability score based on the one or more identified defects, comparing the acceptability score to a predetermined acceptability standard, if the acceptability score is greater than the predetermined acceptability standard, generating a notification indicating an acceptability of the lattice structure, and if the acceptability score is lower than the predetermined acceptability standard, generating a notification indicating the lattice structure as defective.

In some aspects, the techniques described herein relate to a system, wherein the filter includes a Frangi filter configured to identify spherical structures as nodes.

In some aspects, the techniques described herein relate to a system, wherein the set of computed tomography data includes one or more stitched portions of computed tomography data, each portion of computed tomography data corresponding to a respective portion of the lattice structure, wherein the lattice structure is additively manufactured.

In some aspects, the techniques described herein relate to a system, further including selecting a scanning resolution for the set of computed tomography data based on an average strut width of the lattice structure, and scanning the lattice structure using a computed tomography scanner to obtain the set of computed tomography data at the selected scanning resolution.

In some aspects, the techniques described herein relate to a system, further including generating a notification to a user including an indication of the one or more defects, a position and type of the one or more defects, and an acceptability score of the lattice structure based on the one or more defects.

Further embodiments relate to systems, methods, and computer-readable media for analyzing a skeletonization of a scanned lattice structure within a structural simulation. The skeletonization is generated based on a plurality of nodes and a plurality of struts identified within the lattice structure thereby providing a simplified representation of the lattice structure as compared to a typical meshed representation.

In some aspects, the techniques described herein relate to a method for evaluating a lattice structure, the method including: receiving a set of computed tomography data including a volumetric representation of the lattice structure; applying a filter to the set of computed tomography data to identify a plurality of nodes within the lattice structure; applying a three-dimensional path traversal from at least a portion of the plurality of nodes to identify a plurality of struts within the lattice structure from the set of computed tomography data; extracting one or more cross-sectional slices from the plurality of struts within the lattice structure; generating a skeletonization representing the lattice structure based on the plurality of nodes and the plurality of struts; defining one or more fixed locations and one or more force application points within the skeletonization; and analyzing the skeletonization and the one or more cross-sectional slices with the one or more fixed locations and the one or more force application points to determine a performance of the lattice structure.

In some aspects, the techniques described herein relate to a method, further including: generating a stiffness matrix for the lattice structure based on the skeletonization and the one or more cross-sectional slices, wherein analyzing the skeletonization includes analyzing the stiffness matrix for the lattice structure.

In some aspects, the techniques described herein relate to a method, further including: determining a respective area associated with the one or more cross-sectional slices.

In some aspects, the techniques described herein relate to a method, further including: identifying a curvature of at least one strut from the plurality of struts; and partitioning the at least one strut into a plurality of individual straight line segments.

In some aspects, the techniques described herein relate to a method, further including: determining an average cross-sectional area of each respective individual straight line segment of the plurality of individual straight line segments.

In some aspects, the techniques described herein relate to a method, wherein the filter applied to the set of computed tomography data includes a Frangi filter.

In some aspects, the techniques described herein relate to a method, further including: storing the skeletonization as a set of binary information within a text file.

In some aspects, the techniques described herein relate to one or more non-transitory computer-readable media that store computer-executable instructions that, when executed by at least one processor perform a method for evaluating a lattice structure, the method including: receiving a set of computed tomography data including a volumetric representation of the lattice structure; identifying a plurality of nodes within the lattice structure; applying a three-dimensional path traversal from at least a portion of the plurality of nodes to identify a plurality of struts within the lattice structure from the set of computed tomography data; extracting one or more cross-sectional slices from the plurality of struts within the lattice structure; generating a skeletonization representing the lattice structure based on the plurality of nodes and the plurality of struts; defining one or more fixed locations and one or more force application points within the skeletonization; and analyzing the skeletonization and the one or more cross-sectional slices with the one or more fixed locations and the one or more force application points to determine a performance of the lattice structure.

In some aspects, the techniques described herein relate to one or more non-transitory computer-readable media, wherein the plurality of nodes are identified using a Frangi filter applied to the set of computed tomography data.

In some aspects, the techniques described herein relate to one or more non-transitory computer-readable media, wherein the method further includes: comparing a performance score of the lattice structure to a predefined suitability threshold to determine a suitability of the lattice structure under a loading condition.

In some aspects, the techniques described herein relate to one or more non-transitory computer-readable media, wherein one or more defects within the lattice structure are identified based on the performance determined for the lattice structure.

In some aspects, the techniques described herein relate to one or more non-transitory computer-readable media, wherein the method further includes: iteratively adjusting the one or more fixed locations and the one or more force application points within the skeletonization.

In some aspects, the techniques described herein relate to one or more non-transitory computer-readable media, wherein the method further includes: selecting one or more loading conditions for the lattice structure based at least in part on iteratively adjusting the one or more fixed locations and the one or more force application points within the skeletonization.

In some aspects, the techniques described herein relate to one or more non-transitory computer-readable media, wherein a scanning resolution of the set of computed tomography data is selected based on an average strut width of the lattice structure.

In some aspects, the techniques described herein relate to a system for evaluating a lattice structure, the system including: at least one processor; and one or more non-transitory computer-readable media that store computer-executable instructions that, when executed by the at least one processor, perform a method for evaluating a lattice structure, the method including: receiving a set of computed tomography data including a volumetric representation of the lattice structure; applying a filter to the set of computed tomography data to identify a plurality of nodes within the lattice structure; applying a three-dimensional path traversal from at least a portion of the plurality of nodes to identify a plurality of struts within the lattice structure from the set of computed tomography data; extracting one or more cross-sectional slices from the plurality of struts within the lattice structure; and generating a skeletonization representing the lattice structure based on the plurality of nodes and the plurality of struts.

In some aspects, the techniques described herein relate to a system, wherein the method further includes: defining one or more fixed locations and one or more force application points within the skeletonization.

In some aspects, the techniques described herein relate to a system, wherein the method further includes: analyzing the skeletonization and the one or more cross-sectional slices with the one or more fixed locations and the one or more force application points to determine a performance of the lattice structure.

In some aspects, the techniques described herein relate to a system, wherein the method further includes: receiving a subsequent set of computed tomography data including a volumetric representation of a subsequent lattice structure distinct from the lattice structure; and analyzing a subsequent skeletonization corresponding to the subsequent set of computed tomography data to determine a performance of the subsequent lattice structure.

In some aspects, the techniques described herein relate to a system, wherein the method further includes: comparing the performance of the lattice structure to the performance of the subsequent lattice structure.

In some aspects, the techniques described herein relate to a system, wherein the plurality of nodes are identified using one or more filters applied to the set of computed tomography data.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein:

FIG. 11 depicts an exemplary stiffness matrix equation corresponding to a lattice structure skeletonization relating to some embodiments; and FIG. 12 depicts an exemplary method of simulating a lattice structure relating to some embodiments.

Figure 1:
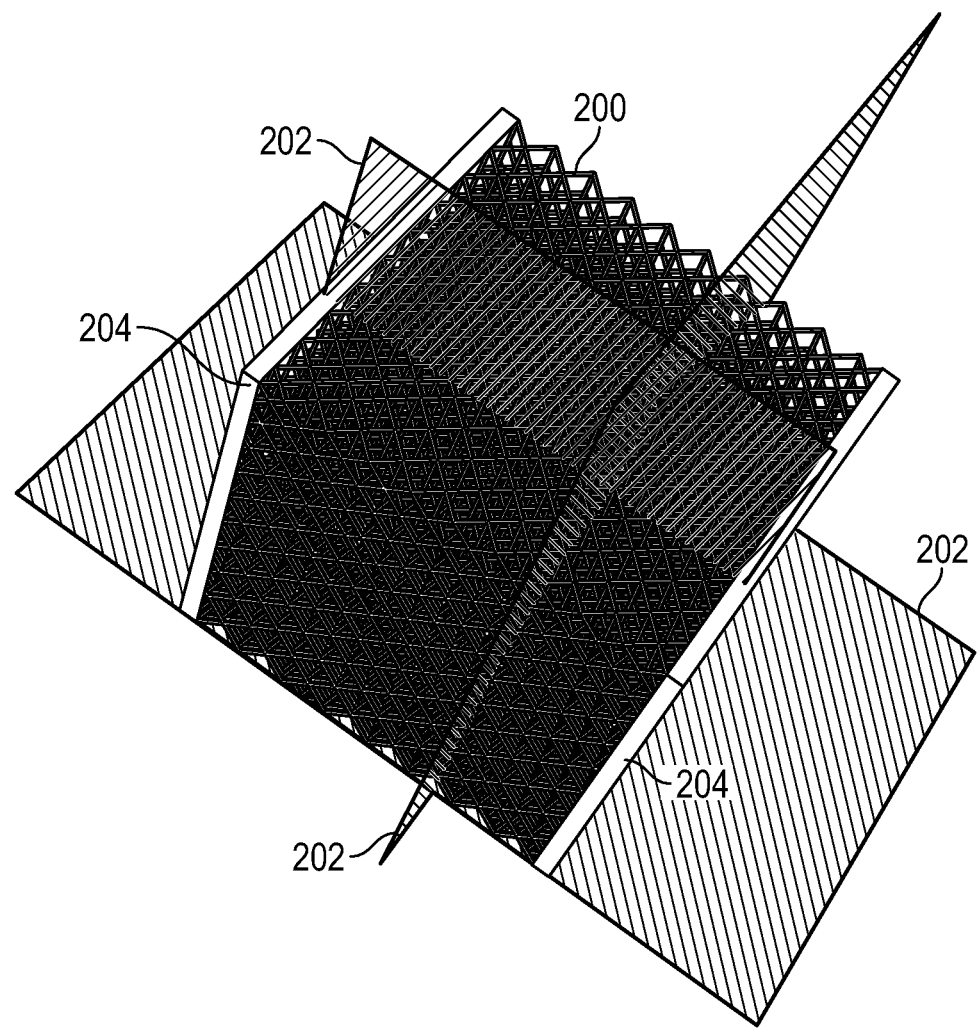
FIG. 1 depicts a computed tomography scan of an exemplary lattice structure relating to some embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Turning first to FIG. 1, a computed tomography scan of an exemplary lattice structure 100 is depicted relating to some embodiments of the invention. In some embodiments, one or more 2-dimensional planes 102 may be defined within the lattice structure 100. In some such embodiments, 2-dimensional slices of the lattice structure 100 are included within each of the one or more 2-dimensional planes 102. In some embodiments, the lattice structure 100 may comprise an octet truss unit cell which is repeated throughout the volume of the lattice structure 100. However, embodiments are contemplated in which any suitable type of unit cell may be used such as simple unit cells and more complex unit cells based on the specific application of the lattice structure 100. In some embodiments, the lattice structure 100 comprises any type of truss-based lattice structure including one or more truss-like structures such as struts incorporated into each individual unit cell.

In some embodiments, the lattice structure 100, as described herein, may be 3D printed, such as by additive manufacturing. Accordingly, in some such embodiments, a 3-dimensional mesh representing the intended lattice structure may be used to instruct the 3D printing process of the lattice structure 100. However, embodiments are contemplated in which a variety of other suitable manufacturing processes are used to create the lattice structure 100, such as, for example, subtractive processes, molding processes, and other processes that are not explicitly described herein. In some embodiments, the lattice structure 100 may comprise a material that is compatible with X-ray technology such that a sufficient CT scan can be provided for the lattice structure 100. Accordingly, in some embodiments, the material of the lattice structure 100 may be selected from one or more of aluminum (including aluminum alloys), titanium (including titanium alloys), steel (including stainless steel and other steel alloys), and polymers, as well as other suitable materials not explicitly described herein.

It should be understood that, in some embodiments, the planes 102 defined within the lattice structure 100 may be positioned and oriented differently than as shown. For example, in some embodiments, the planes 102 may be positioned and oriented based on specific components within the lattice structure 100, as will be described in further detail below. For example, the planes 102 may be oriented to analyze specific portions and individual components of the lattice structure 100.

In some embodiments, the lattice structure 100 further comprises at least one mounting structure 104. In some embodiments, the mounting structure 104 may be secured to one or more outer surfaces of the lattice structure 100, as shown. In some embodiments, the mounting structure 104 may be included to support at least a portion of the lattice structure 100 or to mount the lattice structure 100 onto another component during use. For example, embodiments are contemplated in which the lattice structure 100 may be mounted within a housing using the mounting structure 104. Further, the mounting structure 104 may be used to secure the lattice structure 100 in place during testing or analysis by the CT scanner 208.

In some embodiments, the mounting structure 104 may be 3D printed along with the lattice structure 100. Accordingly, in some such embodiments, the mounting structure 104 may include the same material as the lattice structure 100. Additionally, in some embodiments, the mounting structure 104 may be a separate part secured to the lattice structure 100. Further, in some embodiments, the lattice structure 100 may be printed directly onto the mounting structure 104. Further still, embodiments are contemplated in which the mounting structure 104 is not included.

Figure 2:
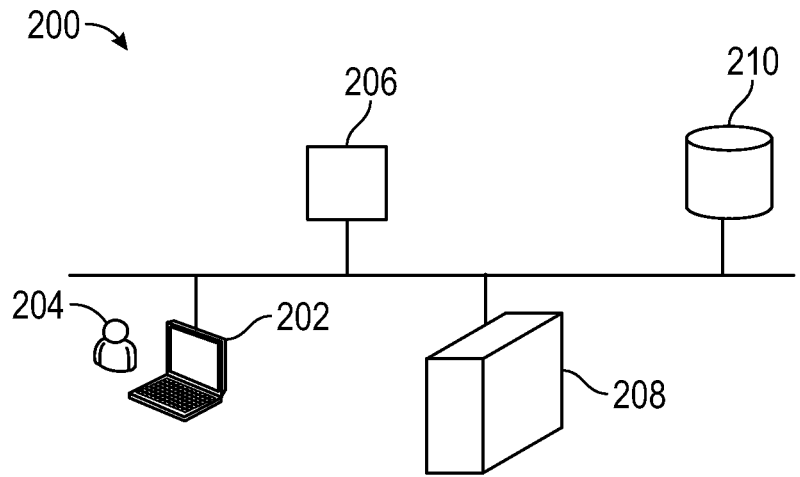
FIG. 2 depicts a system diagram of an exemplary system relating to some embodiments of the invention.

Turning now to FIG. 2, a system diagram of an exemplary system 200 is depicted relating to some embodiments of the invention. In some embodiments, the system 200 comprises a user device 202 which may be operated by a user 204. In some such embodiments, the user device 202 may comprise any of a laptop computer, a desktop computer, a tablet, a mobile phone, or another type of suitable user device. In some embodiments, a lattice structure evaluation application 206 may be provided on the user device 202. In some embodiments, the lattice structure evaluation application 206 may be stored and executed on the user device 202. Alternatively, in some embodiments, the lattice structure evaluation application 206 may be accessed through a web browser and executed on a remote server. In some embodiments, the system 200 further comprises a computed tomography (CT) scanner 208, as shown. In some embodiments, the CT scanner 208 may be communicatively coupled to the user device 202 to provide one or more CT scans of lattice structures to be evaluated by the lattice structure evaluation application 206. Alternatively, in some embodiments, the CT scans may be stored and retrieved from a data store 210. For example, in some embodiments, the CT scans produced by the CT scanner 208 may be stored within a removable storage device such as a flash drive. Here, the CT scans may be accessed by connecting the removable storage device to the user device 202.

In some embodiments, various components of the system 200 may be communicatively connected, as shown. For example, in some embodiments, any combination of wireless and wired connections may be established between said components. For example, in some embodiments, the lattice structure evaluation application 206 may be accessed over a wireless network connection to a remote server as described in further detail with respect to FIG. 8 below. Additionally, in some embodiments, local network connections may be used for example, to transmit information between the user device 202 and the CT scanner 208.

In some embodiments, any number of additional components may be included within system 200. For example, in some embodiments, the system 200 further comprises a 3D printer for printing a part which is analyzed by the CT scanner 208. Accordingly, said 3D printer may also be communicatively coupled to the user device 202. In some such embodiments, said 3D printed part may comprise the lattice structure 100 as described above.

Figure 3:
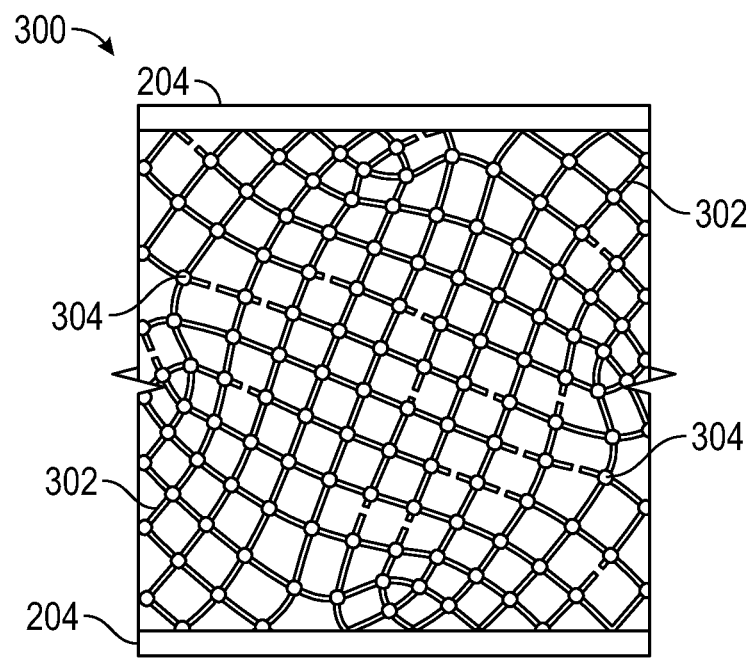
FIG. 3 depicts an exemplary 2-dimensional plane image of a lattice structure relating to some embodiments of the invention.

Turning now to FIG. 3, an exemplary 2-dimensional plane image 300 of the lattice structure 100 is depicted relating to some embodiments of the invention. In some embodiments, the plane image 300 may be extracted based on one of the 2-dimensional planes 102. In some embodiments, the lattice structure 100, which is shown in the plane image 300, comprises a plurality of struts 302 and a plurality of nodes 304. Each strut 302 acts as a structural element between two or more nodes 304 within the lattice structure 100. Each node 304 is a juncture between two or more struts 302. In some embodiments, the lattice structure 100 comprises a plurality of unit cells defined by a plurality of repeated struts 302 and nodes 304. In some embodiments, different types of lattice structures employing various different unit cells may be included. For example, in some embodiments, an octet truss unit cell may be used. Further, embodiments are contemplated in which other types of unit cells may be included such as a simple cubic unit cell, a body-centered cubic, a face-centered cubic, as well as additional simple unit cells and more complex unit cells not explicitly described herein.

In some embodiments, portions of the struts 302 may not be visible or may be broken, as shown. However, based on the 2-dimensional plane image 300 alone it is impossible to discern whether the struts 302 are actually broken or are just not visible due to being out of plane of the 2-dimensional plane image 300. Accordingly, embodiments of the invention may utilize 3-dimensional imaging techniques to determine the actual state of the struts 302 within the lattice structure 100.

Figure 4:
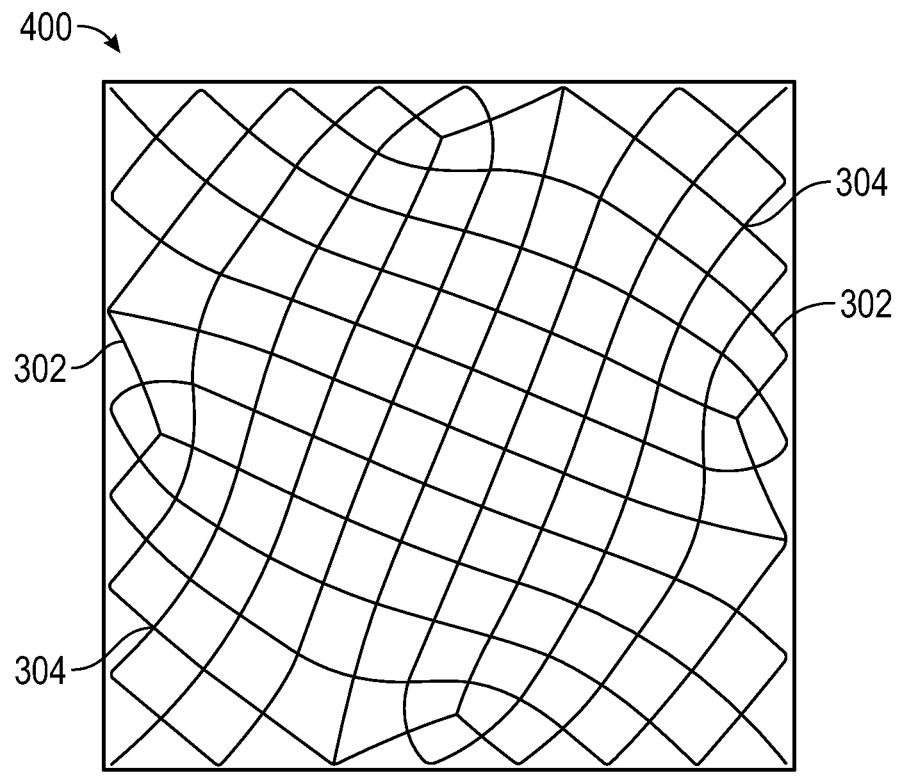
FIG. 4 depicts an exemplary skeletonized volume relating to some embodiments of the invention.

Turning now to FIG. 4, an exemplary skeletonized volume 400 is depicted relating to some embodiments of the invention. In some embodiments, the skeletonized volume 400 may be generated based on either of the CT scan of the lattice structure 100 or a 3-dimensional mesh for the lattice structure 100. For example, in some embodiments, the skeletonized volume 400 is produced by applying a thinning algorithm to the CT scan. In some embodiments, a skeletonization may be generated based on each of the CT scan and the mesh such that both a CT scan skeletonization and a mesh skeletonization are provided. Accordingly, the CT scan skeletonization may be used to identify struts 302 within the CT data of the actual lattice structure 100 while the mesh skeletonization is used to identify the intended struts within the mesh.

In some embodiments, the skeletonization process thins the 3-dimensional data into a single-voxel thick network which maintains the connectivity of the lattice. In some embodiments, various different algorithms may be used for the skeletonization process, as will be described in further detail below. In some embodiments, the skeletonization process provides an additional benefit of removing unnecessary data from the CT data. Accordingly, in some embodiments, only the information used to perform a path traversal and identify defects within the lattice structure 100 is present in the skeletonization. In some embodiments, the skeletonized volume 400 is used to identify branch points within the lattice structure 100. Accordingly, the skeletonized volume 400 may be used to identify and segment struts within the lattice structure 100. In some embodiments, skeletonized data sets from each of the CT data and the mesh data are compared to evaluate deviations and identify one or more defects within the lattice structure 100.

Figure 5:
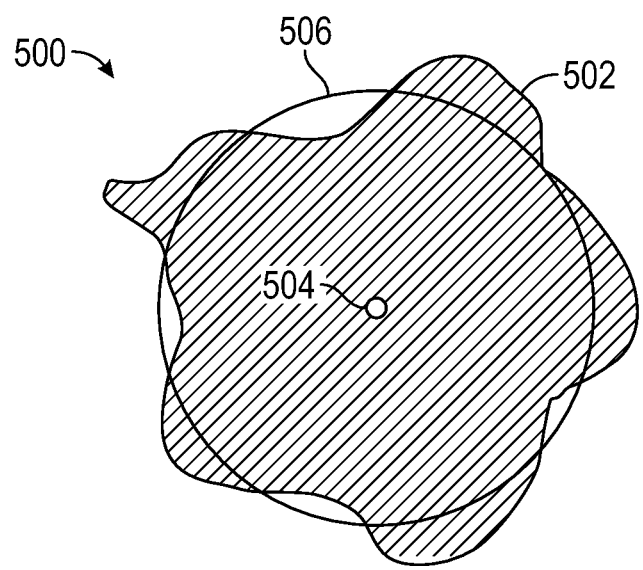
FIG. 5 depicts an exemplary cross-sectional view relating to some embodiments of the invention.

Turning now to FIG. 5, an exemplary cross-sectional view 500 is depicted relating to some embodiments of the invention. In some embodiments, the cross-sectional view 500 comprises an actual cross-section 502, which is a cross-section of a single strut of the plurality of struts 302. In some embodiments, the cross-sectional view 500 is generated by defining a 2-dimensional plane within the lattice structure 100, which is normal to the skeleton path or medial axis 504 of a given strut of the plurality of struts 302. In some embodiments, the cross-sectional view 500 may further comprise a mesh cross-section 506. In some such embodiments, the mesh cross-section 506 may be based on a nominal or ideal volume determined from a predefined mesh. For example, in some embodiments, a CAD model that was used to 3D print the lattice structure 100 may be used to generate the predefined mesh. Additionally, embodiments are contemplated in which the mesh may be generated from a CT scan of a reference part or a reference lattice structure that is ensured to be without defects.

By comparing the actual cross-section 502 and the nominal cross-section 506 various parameters of the actual cross-section may be determined such as the area of the cross-section, the circularity of the cross-section, and the diameter of the cross-section. Additionally, embodiments are contemplated in which the cross-sections may be intended to include other shapes besides the standard circular strut cross-section. For example, elliptical and rectangular cross-sections are also contemplated, as well as other suitable cross-sectional shapes not explicitly described herein. Accordingly, it should be understood that the nominal cross-section will also account for intended cross-sectional shapes.

Figure 6:
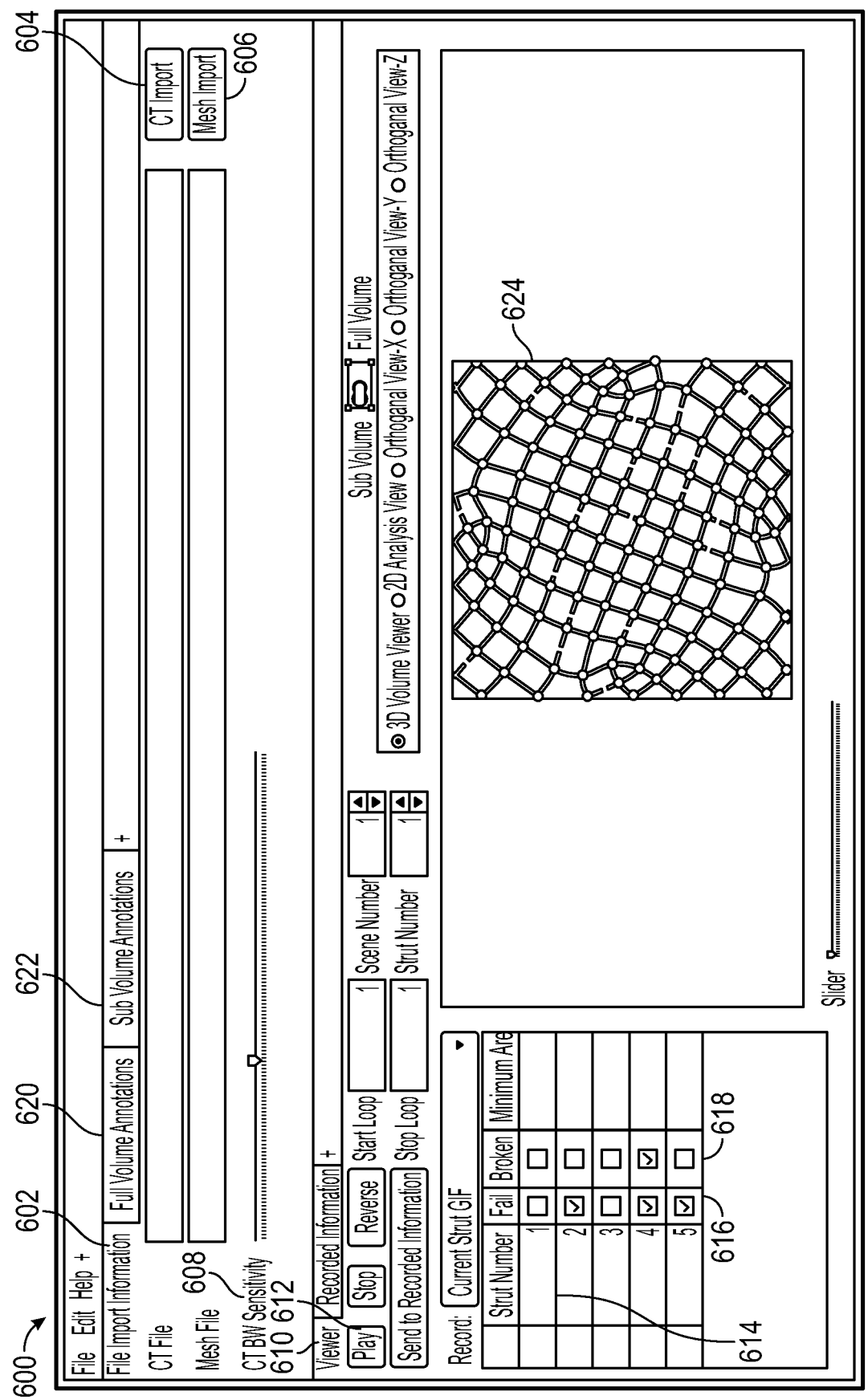
FIG. 6 depicts an exemplary user interface relating to some embodiments of the invention.

Turning now to FIG. 6, an exemplary user interface 600 is depicted relating to some embodiments of the invention. In some embodiments, the user interface 600 may be generated for display, for example, on the user device 202 such that the user interface 600 is visible to the user 204. In some embodiments, the user interface 600 comprises a file import tab 602, as shown, including a CT file selection interface element 604 and a mesh file selection interface element 606 which allow the user to select a CT file and corresponding mesh file, respectively. In some embodiments, the user 204 may import a specific CT file and mesh file using the CT file selection interface element 604 and mesh file selection interface element 606 to import files from the user device 202 or over a network. Further, in some embodiments, the file import tab 602 further comprises a CT sensitivity adjustment interface element 608, as shown, allowing the user to adjust a sensitivity level. In some such embodiments, this sensitivity level determines a sensitivity of a volume segmentation or thresholding process. As such, the sensitivity will define the boundary between identifying material or space within the CT data. For example, the generated 3-D skeletonization defines a binary volume represented by ones and zeros and the sensitivity level may be used to determine a threshold for identifying portions of the CT data as either material or space within the lattice structure. In some embodiments, other methods of generating a binary volume may be used such as, for example, ISO50, adaptive thresholding, Otsu thresholding, or other suitable binary volume techniques not explicitly described herein.

In some embodiments, the user interface 600 further comprises a viewer tab 610 which includes one or more viewing controls 612, as shown. In some embodiments, the viewing controls 612 include any combination of a play button, a stop button, a reverse button, and a record button for controlling playback of a Graphics Interchange Format (GIF) file comprising images of a strut. In some embodiments, a set of corresponding strut data may be included on the viewer tab 610, as shown, including a list of strut numbers 614 indicating specific struts within a lattice structure, a list of failure indicators 616 indicating whether a respective strut has failed, and a list of broken indicators 618 indicating whether the respective strut is broken.

In some embodiments, the user interface 600 further comprises a full volume annotation tab 620 and a sub volume annotation tab 622, as shown. In some such embodiments, the full volume annotation tab 620 may be used to provide annotations to an entire volume of the CT and mesh data. Similarly, the sub volume annotation tab 622 may be used to provide annotations to certain sub volumes or portions of the CT and mesh data.

In some embodiments, the user interface 600 further comprises a visual representation 624 of the lattice structure 100. In some embodiments, the visual representation 624 may include a 2-dimensional plane image of the lattice structure 100, as shown. However, it should be understood that, in some embodiments, the visual representation 624 may include a view from a 3-dimensional path traversal such as a cross-sectional image of one of the plurality of struts 302. For example, in some embodiments, if the user 204 selects a strut from the list of struts numbers 614 the visual representation 624 may be updated to include a visualization of the selected strut. Accordingly, the user interface 600 may be used to provide a substantial amount of information to the user 204 regarding the location and type of strut defects within the lattice structure 100.

It should be understood that a variety of different forms of the user interface 600 are also contemplated. For example, in some embodiments, the user interface 600 may include additional features and interface elements (not shown). Further, in some embodiments, certain interface elements shown and described herein may be removed from the user interface 600. Further still, in some embodiments, portions of the user interface 600 may be restructured and repositioned. For example, in some embodiments, the viewer tab 610 may be positioned in a different location on the user interface 600.

Figure 7:
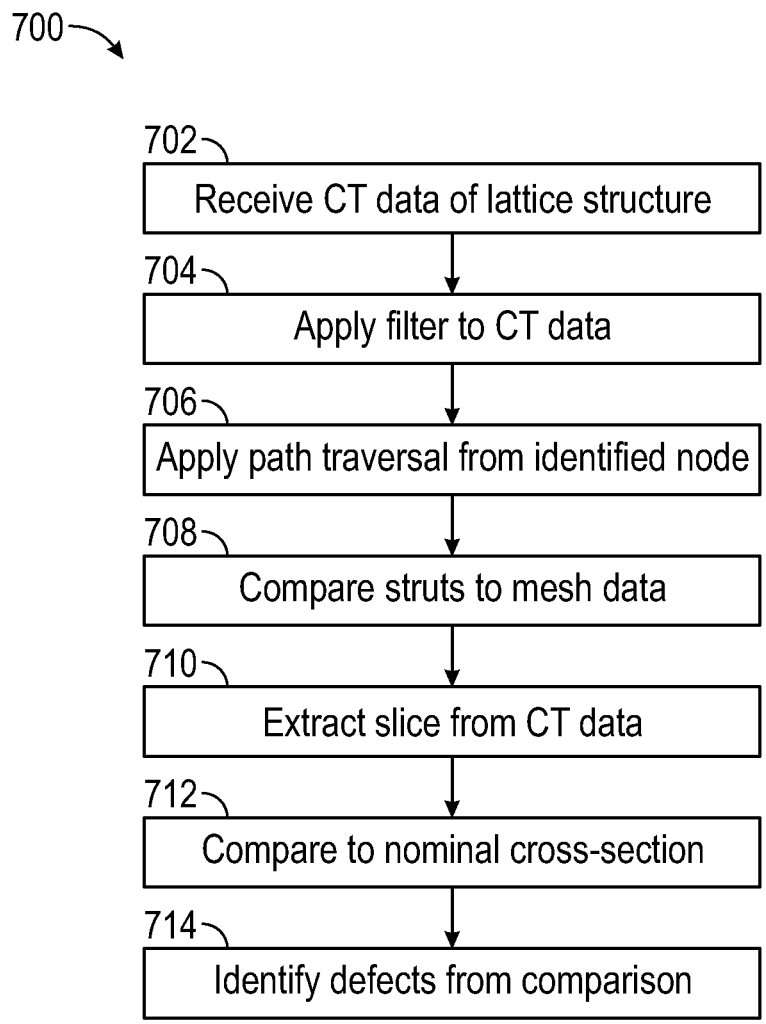
FIG. 7 depicts an exemplary method for evaluating a lattice structure relating to some embodiments of the invention.

Turning now to FIG. 7, an exemplary method 700 for evaluating a lattice structure is depicted relating to some embodiments of the invention. In some embodiments, at least a portion of the method 700 may be executed using at least one processor. For example, in some embodiments, processing may be distributed such that a first processor performs a first portion of steps while a second processor performs a second portion of steps.

At step 702, a set of computed tomography data including a volumetric representation of the lattice structure 100 is received. In some embodiments, the CT data may be received from the CT scanner 208, as shown in FIG. 2. Further, in some embodiments, the CT data may be selected and retrieved by the user 204 operating the user device 202 using the user interface 600, as shown in FIG. 6 to select a CT file comprising the CT data.

At step 704, a filter is applied to the CT data from step 702. In some embodiments, the filter comprises a Frangi filter. Such a filter is typically utilized in the medical industry to identify organic vessel-like structures such as blood vessels within medical scan data. However, embodiments of the present disclosure recognize the capability of the Frangi filter to identify substantially spherical or blob-like structures and contemplate using the Frangi filter to identify non-organic sphere-like structures such as nodes within a lattice structure. In some embodiments, any filter suitable to identify spherical or blob-like structures may be used. Accordingly, the filter may be used to identify any number of nodes of the lattice structure 100 within the CT data. In some embodiments, the filter is also applied to the mesh data to identify nodes within the mesh. Further, embodiments are contemplated in which the same mesh may be used to evaluate a plurality of similar lattice structures.

Accordingly, the filter may be applied to the mesh data initially but can then be stored and reused for subsequent lattice structure evaluations. In some such embodiments, the filtered mesh data may be stored in a data store such as, for example, data store 210, as shown in FIG. 2. In some embodiments, the filter may be used to identify only nodes within the lattice structure 100. However, embodiments are also contemplated in which the filter identifies both a plurality of nodes and a plurality of struts within the lattice structure 100. Alternatively, in some embodiments, struts may be identified using other means such as a three-dimensional path traversal, as described in further detail below.

In some embodiments, additional steps may be included for generating skeletonizations of the CT data or mesh data. For example, in some embodiments, a skeletonization algorithm may be applied which generates a simplified skeletonized representation of the lattice structure 100, as described above with respect to FIG. 4. In some embodiments, the skeletonization algorithm may be applied before applying the filter. For example, the skeletonization algorithm may be applied to a threshold volume which comprises the raw mesh or CT data converted into a binary volume in which a threshold is set to determine whether portions of the data include material or empty space. In some embodiments, this threshold may be predefined or configured by a user as a sensitivity level.

At step 706, a 3D path traversal is applied from one or more of the identified nodes within the CT data. In some embodiments, the path traversal is used to identify one or more lattice connections or struts within the lattice structure 100. For example, in some embodiments, the path traversal identifies a plurality of struts within the lattice structure. In some such embodiments, the path traversal may be applied from the center of a node moving outwardly to monitor the connected struts. Further, in some embodiments, a skeletonization may be used perform the path traversal. In some embodiments, the path traversal may be applied on each of the CT data and the mesh data. In some embodiments, the path traversal may be determined based on a nominal path between two nodes of the lattice structure 100. For example, the nominal path may comprise a straight line from a starting node to a target node. Additionally, in some embodiments, the nominal path may include intended curvature from the mesh data.

At step 708, each strut of the plurality of struts identified within the lattice structure 100 from the path traversal is compared to a respective strut identified within the mesh data. In some embodiments, this comparison is used to identify one or more defective struts within the lattice structure 100 which may be broken or missing from the CT data. For example, if a strut is present within the mesh data but is not present within the CT data, that strut will be identified as missing. In some embodiments, the plurality of struts within the mesh data may automatically account for intended effects within the lattice structure 100 such as intentional strut curvature. For example, if a strut 302 is intended to be curved, the strut will be curved also within the mesh data such that the skeleton path and medial axis will include any intended curvature.

At step 710, one or more slices are extracted from the set of CT data based at least in part on the path traversal of step 706. For example, in some embodiments, the slices are extracted along the path of each monitored strut such that the cross-section of the respective strut may be analyzed. In some embodiments, the extracted slice may comprise a representation of the actual cross-section 502, as shown in FIG. 5. In some embodiments, the extracted slice may be selected based on the medial axis 504 defined for the strut from the path traversal.

In some embodiments, steps 702, 704, 706, and 710 may also be applied for the mesh data. For example, the mesh data may be received, filtered, and a path traversal may be applied to the mesh data. Further, one or more slices may be extracted from the mesh data based on said path traversal. In some embodiments, these steps may be applied to the mesh data before the CT data is even received. For example, the mesh data may be analyzed ahead of time and then reused for a plurality of different sets of CT data to analyze a plurality of similar lattice structures.

At step 712, the actual cross-section 502 from the one or more extracted slices is compared to the nominal cross-section 506 from the mesh data. In some embodiments, the nominal cross-section 506 may be extracted similarly based on the medial axis 504 from the path traversal or based on the skeletonization. It should be understood that various different comparison methods may be employed to compare the cross-sections. For example, in some embodiments, the cross-sections may be compared to show a percentage difference or a difference of position in a 2-dimensional center of mass for the cross-sections. In some embodiments, the center of mass for the mesh cross-section may always fall along the medial axis such that the center of mass of the actual cross-section is compared to the medial axis. In some embodiments, the comparison of the actual cross-section 502 and the nominal cross-section 506 is used to determine one or more inconsistencies between the lattice structure 100 and the corresponding mesh. It should be understood that the comparison of step 712 may be applied multiple times along the length of each strut such that a plurality of different cross-sections is analyzed and compared.

In some embodiments, inconsistencies may be identified based on factors relative to the medial axis 504 for a given strut. For example, parameters such as standard deviation, mean-square error, and curvature may be considered by comparing the centers of the struts to the medial axis. Accordingly, in some embodiments, defects may be identified based at least in part on these parameters. Additionally, or alternatively, inconsistencies may be identified based on comparing other factors of the cross-sections. For example, parameters such as area, circularity, perimeter, and other cross-sectional metrics may be considered when comparing the cross-sections. In some embodiments, inconsistencies may be identified by comparing adjacency matrices for each of the CT data and the mesh data. For example, in some embodiments, an adjacency matrix may be generated for each node of the plurality of nodes 304 identified within the CT data, as well as for each node from the predefined mesh. The adjacency matrices may then be compared to identify inconsistencies between the CT data and the mesh data. Additionally, or alternatively, in some embodiments, the CT data and mesh data may be compared by sequentially looping through each strut of the plurality of struts and comparing whether they are present in both of the CT data and the mesh data.

At step 714, one or more defects are identified within the lattice structure 100 based on the one or more inconsistencies from the comparison of step 712. In some embodiments, an indication of the identified defects may be stored or added into a report. For example, the defects may be listed within the user interface 600, as shown in FIG. 6. Accordingly, the user 204 may be notified of the defects within the lattice structure 100. In some embodiments, an acceptability score may be generated for the lattice structure 100 based on the one or more defects. Accordingly, the lattice structure 100 may be deemed to be defective if the acceptability score is below a predetermined acceptability standard based on the lattice structure 100 comprising too many defects or at least one vital defect. In some embodiments, a predetermined acceptability standard may comprise an acceptability score between about 90% to about 99%. Alternatively, if the acceptability score exceeds the predetermined acceptability standard, the lattice structure 100 is determined to be acceptable. It should be understood, in some embodiments, that some types of defects may be given a greater weighting in determining the acceptability score than other types of defects. For example, a defect associated with a completely disconnected or broken strut may be detrimental to the overall acceptability score while a defect associated with a strut that is out of position compared to the mesh will have a relatively small effect on the overall acceptability score.

In some embodiments, the defects that are monitored for within the lattice structure 100 comprise any combination of missing struts, broken struts, substantially thick struts, substantially thin struts, bent struts, as well as volumetric defects. In some embodiments, additional types of defects may be monitored, for example, based on one or more specified user criteria. In some such embodiments, volumetric defects may be monitored by evaluating data from the comparisons of multiple cross-sections along the length of a strut 302. Accordingly, in some embodiments, an algorithm may be included for volumetrically analyzing the lattice structure 100. Further, in some embodiments, structural simulations may be applied using the evaluation data from the cross-sectional comparisons to determine potential failure mechanisms and points of concern within the lattice structure 100.

In some embodiments, the method 700 further comprises notifying the user 204 or an operator of the one or more defects. In some such embodiments, the user 204 may also receive an indication of the position and type of each defect within the lattice structure 100. For example, in some embodiments, a table of information comprising the list of strut numbers 614, the list of failure indicators 616, and the list of broken indicators 618 may be generated for the user interface 600, as shown in FIG. 6. Further, in some embodiments, the user 204 may be able to select a value from any of the lists 614, 616, or 618 to view more information or to view the specific location of the respective strut within the lattice structure 100. In some embodiments, the notification generated for the user 204 may further comprise the acceptability score determined for the lattice structure 100, as well as an indication of whether the lattice structure 100 is acceptable or defective.

It should be understood that some embodiments of the invention may be applied to parts that do not comprise lattice structures and/or are not 3D printed. In some such embodiments, a part may be scanned by the CT scanner 208 and may be compared to a reference part. Here, the reference part may be a previously created version of the part that is ensured to be without defects. Accordingly, in such embodiments, the reference part may be used to identify defects within the part similar to how the mesh is used to identify defects within the lattice structure 100. In some embodiments, a 3D scan of the reference part may be used in place of the mesh. Additionally, in some embodiments, a 3D mesh which comprises a 3D model representation from a modeling software may be used. Accordingly, the filter such as the Frangi filter may be applied to the CT data of the part to identify struts and nodes within the part.

Further, it should be understood that various parameters may be scaled or altered within some embodiments of the invention. For example, in some embodiments, the scanning resolution of the initial CT scan of the lattice structure 100 may be scaled based on an average width of the struts 302 within the lattice structure 100. Here, for example, the scanning resolution may be selected such that about 8 to 10 pixels are included across the width of each strut 302. Accordingly, the scanning resolution will be sufficient to identify defects within the lattice structure 100. As such, embodiments may be applied to virtually any size of lattice structure while scaling the scanning resolution based on the average strut width. In some such embodiments, the size of the analyzed lattice structures is limited by the CT system used to scan the lattice structure based on factors such as weight, size, axis travel, and other CT specific factors. Further, in some embodiments, multiple separate scans may be stitched together for a lattice structure such that lattice structures too large to be analyzed from a single scan are accommodated for. Additionally, in some embodiments, the analysis may be separated into portions where only a portion of the lattice structure 100 is evaluated for defects at a time. In some embodiments, the scanning resolution may be selected based further on the overall geometry of the lattice structure 100.

Figure 8:
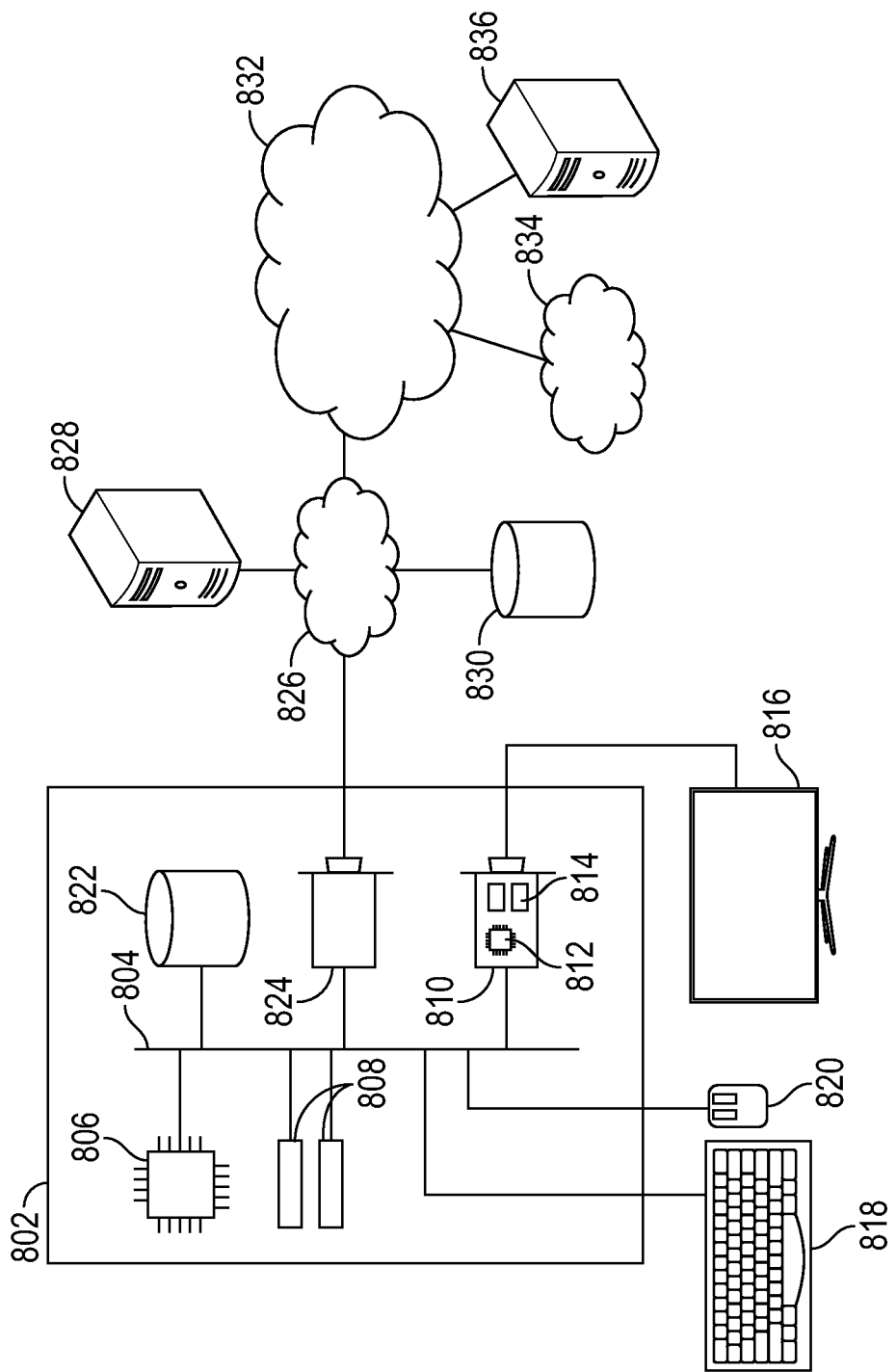
FIG. 8 depicts an exemplary hardware platform for certain embodiments of the invention.

Turning now to FIG. 8, an exemplary hardware platform for certain embodiments of the invention is depicted. In some embodiments, user device 202 may be computer 802, which can be a desktop computer, a laptop computer, a server computer, a mobile device such as a smartphone or tablet, or any other form factor of general- or special-purpose computing device. Depicted with computer 802 are several components, for illustrative purposes. In some embodiments, certain components may be arranged differently or absent. Additional components may also be present. Included in computer 802 is system bus 804, whereby other components of computer 802 can communicate with each other. In certain embodiments, there may be multiple busses or components may communicate with each other directly. Connected to system bus 804 is central processing unit (CPU) 806. Also attached to system bus 804 are one or more random-access memory (RAM) modules 808. Also attached to system bus 804 is graphics card 810. In some embodiments, graphics card 810 may not be a physically separate card, but rather may be integrated into the motherboard or the CPU 806. In some embodiments, graphics card 810 has a separate graphics-processing unit (GPU) 812, which can be used for graphics processing or for general purpose computing (GPGPU). Also on graphics card 810 is GPU memory 814. Connected (directly or indirectly) to graphics card 810 is display 816 for user interaction. In some embodiments no display is present, while in others it is integrated into computer 802. Similarly, peripherals such as keyboard 818 and mouse 820 are connected to system bus 804. Like display 816, these peripherals may be integrated into computer 802 or absent. Also connected to system bus 804 is local storage 822, which may be any form of computer-readable media, and may be internally installed in computer 802 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 824 is also attached to system bus 804 and allows computer 802 to communicate over a network such as network 826. NIC 824 can be any form of network interface known in the art, such as Ethernet, ATM, fiber, Bluetooth®, or Wi-Fi (i.e., the IEEE 802.11 family of standards). NIC 824 connects computer 802 to local network 826, which may also include one or more other computers, such as computer 828, and network storage, such as data store 830. Generally, a data store such as data store 830 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 828, accessible on a local network such as local network 826, or remotely accessible over Internet 832. Local network 826 is in turn connected to Internet 832, which connects many networks such as local network 826, remote network 834 or directly attached computers such as computer 836. In some embodiments, computer 802 can itself be directly connected to Internet 832.

In some embodiments, the generated skeletonization may be provided to one or more simulation applications or analysis applications. For example, the skeletonization may be provided to a structural analysis program to run a structural simulation using the skeletonization of the lattice structure, as will be described in further detail below with respect to FIGS. 9-11.

Figure 9:
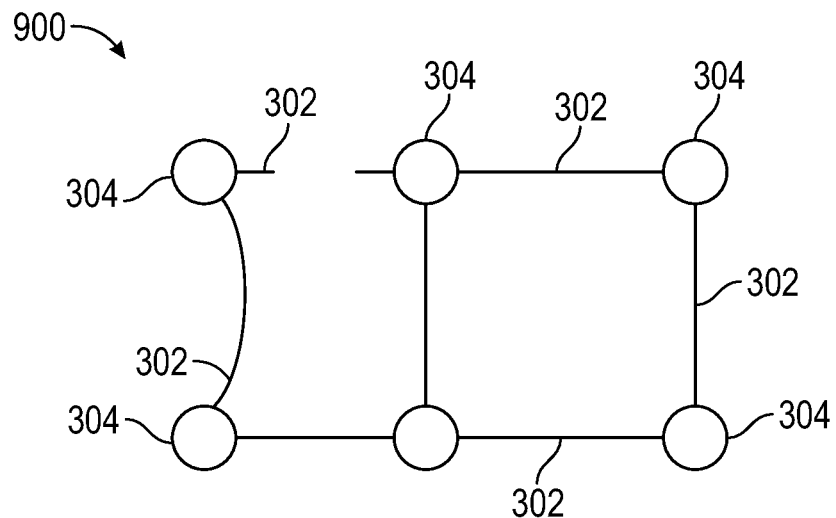
FIG. 9 depicts an exemplary skeletonization of a lattice structure relating to some embodiments.

Turning now to FIG. 9, a skeletonization 900 of an exemplary lattice structure is shown relating to some embodiments. The skeletonization 900 may be provided to a simulation application or the like to be analyzed. As described above the skeletonization 900 includes a plurality of struts 302 and a plurality of nodes 304 identified within the lattice structure. Additionally, as shown, the contour of each individual strut 302 is included within the skeletonization 900. For example, the skeletonization 900 may include the curvature of one or more struts, as well as one or more broken or bent struts, such that the simulation is able to factor in these deficiencies and/or alterations of the lattice structure. Accordingly, the simulation provides a more accurate representation of the actual lattice structure, as compared to a standard simulation that uses an ideal lattice structure, for example, a CAD model of the lattice structure.

It should be understood that the exemplary skeletonization 900 is shown as a 2-dimensional structure for simplicity; however, embodiments are contemplated in which the skeletonization 900 comprises a 3-dimensional representation of the lattice structure.

Figure 10:
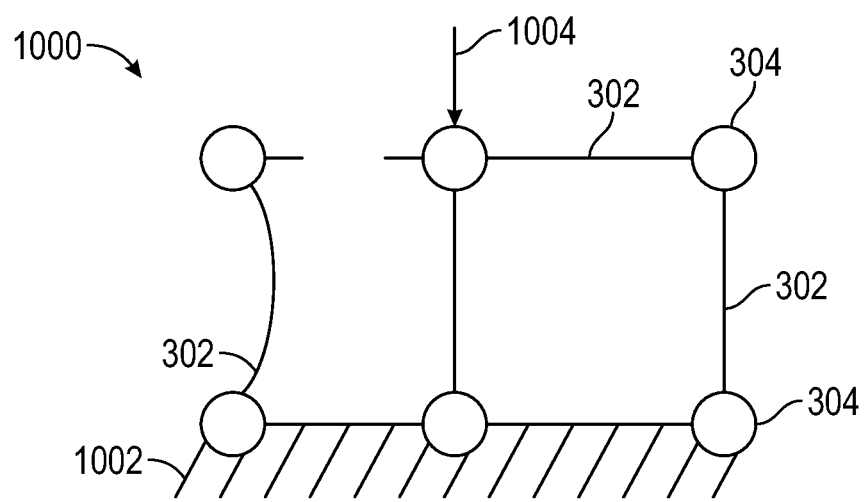
FIG. 10 depicts an exemplary structural simulation incorporating a skeletonization of a lattice structure relating to some embodiments.

Turning now to FIG. 10, an exemplary structural simulation 1000 incorporating the skeletonization 900 is shown relating to some embodiments. In the structural simulation 1000, one or more fixed locations 1002 and one or more force application points 1004 are defined within the skeletonization 900. The fixed locations 1002 may define fixed constraints within portions of the skeletonization 900. For example, one or more struts 302 and nodes 304 may be constrained at a specific position within the simulation by the defined fixed locations 1002. In one example, the fixed locations 1002 may be used to represent a wall or floor that a portion of the lattice structure is fixed to.

Similarly, the force application points 1004 may define one or more points within the skeletonization 900 where a force is applied. For example, a force application point 1004 may be applied at a particular node 304 of the skeletonization 900. Accordingly, the simulation 1000 is able to consider the structural effects of the applied force on the lattice structure. In some embodiments, the defined force application point 1004 comprises a particular location within the skeletonization, a magnitude, and a direction.

Turning now to FIG. 11, an exemplary stiffness matrix equation 1100 relating to some embodiments. The stiffness matrix 1100 may be generated based on one or more parameters of the skeletonization 900. The stiffness matrix equation 1100 includes a stiffness matrix 1102, k, determined based on the geometry of the skeletonization 900. The stiffness matrix 1102, k, is multiplied by a displacement vector 1104, u, as shown. The stiffness matrix 1102, k, multiplied by the displacement vector 1104, u, is equal to the force vector 1106, f.

In some embodiments, the stiffness matrix compares the force applied to the displacement of the lattice structure (or skeletonized representation thereof) and may be generated based on one or more parameters of the lattice structure such as the Young's modulus of the lattice structure material, the length of each respective strut, and one or more cross-sectional areas of the struts. In some embodiments, a number of cross-sectional areas may be used along a given strut. Further, it should be understood that a plurality of stiffness matrices may be generated and analyzed for a given lattice structure. For example, embodiments are contemplated in which a respective stiffness matrix is generated for each strut or for a portion of the lattice structure.

Turning now to FIG. 12, an exemplary method 1200 of simulating a lattice structure relating to some embodiments is depicted. In some embodiments, at least a portion of steps of the method 1200 are performed by at least one processor. For example, one or more steps may be performed by a processor running a simulation program or the like.

At step 1202, a set of CT data is received. The CT data may comprise, for example, a CT scan of a lattice structure. At step 1204, a plurality of nodes present in the lattice structure are identified within the CT data. In some embodiments, the plurality of nodes may be identified by applying one or more filters to the CT data. For example, a Frangi filter may be used to identify blob like structures as nodes within the lattice structure.

At step 1206, a path traversal is applied starting from one or more nodes from the plurality of nodes. For example, the path traversal as described above may begin at a respective node and move outward from the node to identify the presence of one or more struts connected to the node. In some embodiments, the path traversal is used to identify the geometry of the struts connected to the respective node. For example, the path traversal may be used to collect information about the struts such as information relating to a cross-sectional area, a diameter, and other geometric aspects of a particular strut along the length of the strut. In some embodiments, the path traversal identifies a curvature of one or more of the identified struts. In some embodiments, for example, to simulate a curved strut, the strut may be partitioned into a plurality of individual straight line segments to simplify further analysis.

At step 1208, one or more cross-sectional slices are extracted from the CT data. In some embodiments, the cross-sectional slices are extracted from a respective strut during the path traversal of step 1206. Accordingly, each cross-sectional slice comprises data relating to the cross-sectional area of the respective strut.

At step 1210, a skeletonization of the lattice structure is generated from the identified nodes and struts of the lattice structure. At step 1212, the skeletonization is received into a simulation program such as a Finite Element Analysis (FEA) program or another structural simulation program. In some such embodiments, the skeletonization includes or is provided with the one or more cross-sectional slices extracted from the CT data. In some embodiments, the skeletonization may include information relating to curvatures of one or more of the identified struts. For example, the skeletonization may represent a curved strut as a partitioned strut comprising a plurality of individual straight line segments.

At step 1214, one or more constraints and one or more force application points are defined within the skeletonization for the simulation. In some embodiments, the constraints and force application points are selected and received from a user or may be predefined within the simulation. In some embodiments, the constraints comprise one or more fixed locations within the skeletonization.

At step 1216, the skeletonization is analyzed within the simulation based on the cross-sectional data, the one or more constraints, and the one or more force application points. In some embodiments, analysis of the skeletonization within the simulation is used to determine a response of the lattice structure to one or more loading conditions or other structural stimuli. Further, in some embodiments, the simulation may be iterated with changes to either or both of the force application points and fixed locations to determine one or more suitable positions within the lattice structure to be fixed and one or more suitable locations to apply force to the lattice structure. Further, based on analysis of the skeletonization using the simulation, a suitability of the lattice structure may be determined with respect to a particular application with predefined loading conditions and fixed locations. In some embodiments, analysis of the skeletonization is used to determine a performance of the lattice structure. For example, a performance score may be calculated based on the analysis of the skeletonization. Said performance score may be compared to a predefined suitability threshold to determine a suitability of the lattice structure with respect to a particular loading condition.

In some embodiments, a plurality of different lattice structures may be analyzed successively and compared to determine a best suited lattice structure for a particular application. For example, a plurality skeletonizations corresponding to a respective plurality of lattice structures are provided to the simulation and analyzed for a particular loading condition comprising predefined fixed locations and force application points. Accordingly, a performance score may be determined for each lattice structure and the performance scores are compared to determine which lattice structure provides the best performance under the selected loading conditions. For example, a performance score of a first lattice structure may be compared to a performance score of a subsequent lattice structure distinct from the first lattice structure.

In some embodiments, analysis of the skeletonization may be performed using a stiffness matrix generated from the skeletonization. This computation is greatly simplified as compared to the computations associated with typical meshed representations especially for complex objects such as a lattice structure. Accordingly, the amount of processing resources consumed and overall time taken to run the simulation and compute a response of the lattice structure is reduced. As a metric of comparison, the data size of a mesh for a fairly complex lattice structure is typically within the gigabyte range while the data size for the generated skeletonization may be within the kilobyte range for the same structure. Embodiments are contemplated in which the skeletonization may be stored within a text file, for example, as a set of binary information.

In some embodiments, the structural analysis described above may be utilized for non-destructive testing. For example, rather than actually applying force to the lattice structure, the lattice structure is scanned and the skeletonization produced from the CT scan data is used to produce the skeletonization such that the skeletonization derived from the actual lattice structure is tested in the simulation rather than the lattice structure itself. This method of non-destructive testing mitigates risks associated with applying loads to the actual lattice structure. Accordingly, the lattice structure can be tested to the point of failure within the simulation using the skeletonization without loss of or damage to the actual lattice structure.

Additionally, embodiments are contemplated in which other types of simulations may be performed using the skeletonization generated from the CT data of the lattice structure. For example, a thermal simulation or an electrical simulation may be performed using information within the skeletonization. Accordingly, a similar non-destructive testing analysis may be performed to determine thermal and electrical behavior of the lattice structure without damaging or affecting the actual lattice structure.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method for evaluating a lattice structure, the method comprising:
   receiving a set of computed tomography data including a volumetric representation of the lattice structure;
   applying a filter to the set of computed tomography data to identify a plurality of nodes within the lattice structure;
   applying a three-dimensional path traversal from at least a portion of the plurality of nodes to identify a plurality of struts within the lattice structure from the set of computed tomography data;
   extracting one or more cross-sectional slices from the plurality of struts within the lattice structure;
   generating a skeletonization representing the lattice structure based on the plurality of nodes and the plurality of struts;
   defining one or more fixed locations and one or more force application points within the skeletonization;

generating a stiffness matrix for the lattice structure based on the skeletonization and the one or more cross-sectional slices; and analyzing the skeletonization and the one or more cross-sectional slices with the one or more fixed locations and the one or more force application points to determine a performance of the lattice structure, wherein analyzing the skeletonization comprises analyzing the stiffness matrix for the lattice structure.

2. The method of claim 1, further comprising:
determining a respective area associated with the one or more cross-sectional slices.

3. The method of claim 1, further comprising:
identifying a curvature of at least one strut from the plurality of struts; and
partitioning the at least one strut into a plurality of individual straight line segments.

4. The method of claim 3, further comprising:
determining an average cross-sectional area of each respective individual straight line segment of the plurality of individual straight line segments.

5. The method of claim 1, wherein the filter applied to the set of computed tomography data comprises a Frangi filter.

6. The method of claim 1, further comprising:
storing the skeletonization as a set of binary information within a text file.

7. One or more non-transitory computer-readable media that store computer-executable instructions that, when executed by at least one processor perform a method for evaluating a lattice structure, the method comprising:
receiving a set of computed tomography data including a volumetric representation of the lattice structure;
identifying a plurality of nodes within the lattice structure using a Frangi filter applied to the set of computed tomography data;
applying a three-dimensional path traversal from at least a portion of the plurality of nodes to identify a plurality of struts within the lattice structure from the set of computed tomography data;
extracting one or more cross-sectional slices from the plurality of struts within the lattice structure;
generating a skeletonization representing the lattice structure based on the plurality of nodes and the plurality of struts;
defining one or more fixed locations and one or more force application points within the skeletonization; and
analyzing the skeletonization and the one or more cross-sectional slices with the one or more fixed locations and the one or more force application points to determine a performance of the lattice structure.

8. The one or more non-transitory computer-readable media of claim 7, wherein the method further comprises:
comparing a performance score of the lattice structure to a predefined suitability threshold to determine a suitability of the lattice structure under a loading condition.

9. The one or more non-transitory computer-readable media of claim 7, wherein one or more defects within the lattice structure are identified based on the performance determined for the lattice structure.

10. The one or more non-transitory computer-readable media of claim 7, wherein the method further comprises:
iteratively adjusting the one or more fixed locations and the one or more force application points within the skeletonization.

11. The one or more non-transitory computer-readable media of claim 10, wherein the method further comprises:
selecting one or more loading conditions for the lattice structure based at least in part on iteratively adjusting the one or more fixed locations and the one or more force application points within the skeletonization.

12. The one or more non-transitory computer-readable media of claim 7, wherein a scanning resolution of the set of computed tomography data is selected based on an average strut width of the lattice structure.

13. A system for evaluating a lattice structure, the system comprising:
at least one processor; and
one or more non-transitory computer-readable media that store computer-executable instructions that, when executed by the at least one processor, perform a method for evaluating the lattice structure, the method comprising:
receiving a set of computed tomography data including a volumetric representation of the lattice structure;
applying a filter to the set of computed tomography data to identify a plurality of nodes within the lattice structure;
applying a three-dimensional path traversal from at least a portion of the plurality of nodes to identify a plurality of struts within the lattice structure from the set of computed tomography data;
identifying a curvature of at least one strut from the plurality of struts;
partitioning the at least one strut into a plurality of individual straight line segments;
extracting one or more cross-sectional slices from the plurality of struts within the lattice structure; and
generating a skeletonization representing the lattice structure based on the plurality of nodes and the plurality of struts.

14. The system of claim 13, wherein the method further comprises:
defining one or more fixed locations and one or more force application points within the skeletonization.

15. The system of claim 14, wherein the method further comprises:
analyzing the skeletonization and the one or more cross-sectional slices with the one or more fixed locations and the one or more force application points to determine a performance of the lattice structure.

16. The system of claim 15, wherein the method further comprises:
receiving a subsequent set of computed tomography data including a subsequent volumetric representation of a subsequent lattice structure distinct from the lattice structure; and
analyzing a subsequent skeletonization corresponding to the subsequent set of computed tomography data to determine a subsequent performance of the subsequent lattice structure.

17. The system of claim 16, wherein the method further comprises:
comparing the performance of the lattice structure to the subsequent performance of the subsequent lattice structure.

18. The system of claim 13, wherein the plurality of nodes are identified using one or more filters applied to the set of computed tomography data.

19. The system of claim 13, wherein the method further comprises:
determining an average cross-sectional area of each respective individual straight line segment of the plurality of individual straight line segments.

20. The system of claim 13, wherein the method further comprises:

generating a stiffness matrix for the lattice structure based on the skeletonization and the one or more cross-sectional slices.

\* \* \* \* \*